April 10, 1945.  L. S. WILLIAMS  2,373,366
WEIGHING SCALE
Filed Jan. 27, 1943  2 Sheets-Sheet 1
Fig. I
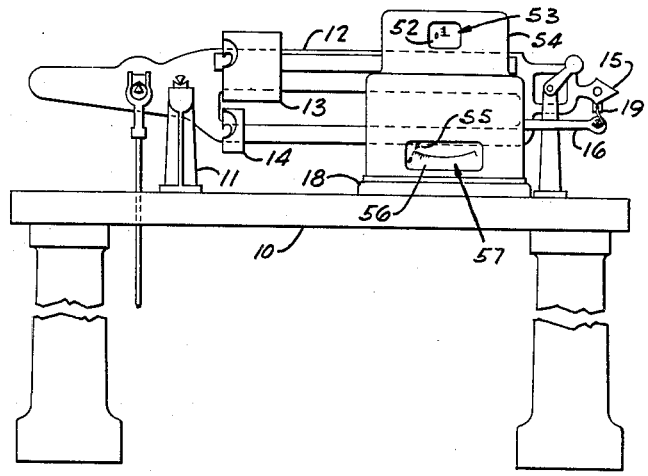
Fig. II
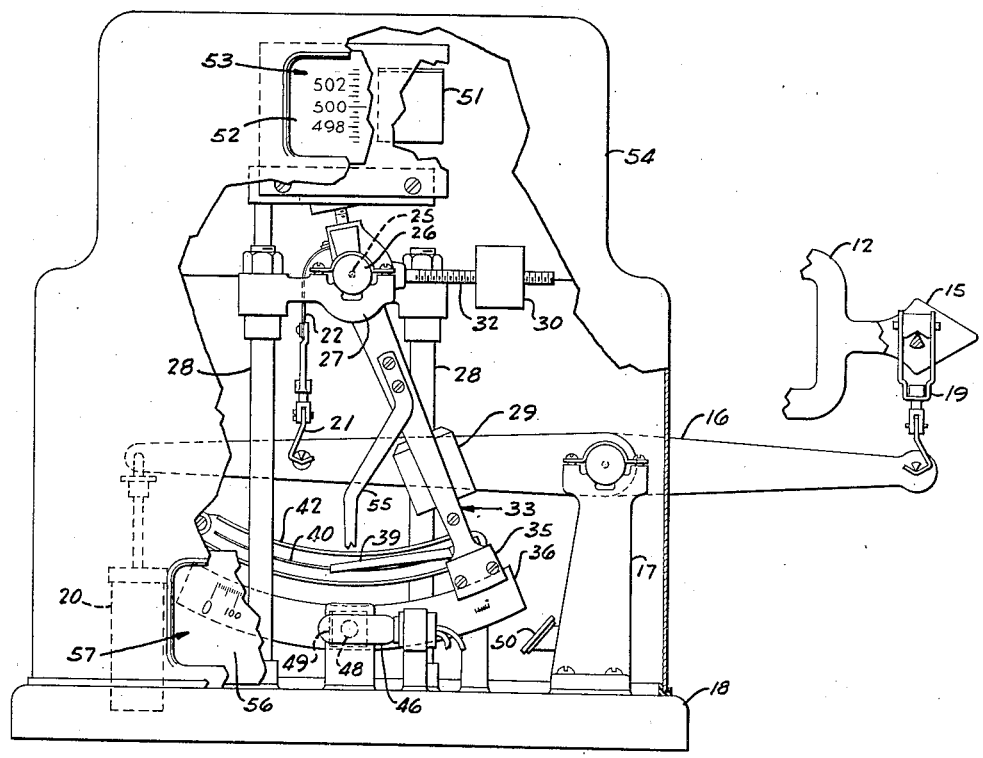
Lawrence S. Williams
INVENTOR.
BY Marshall and Marshall
ATTORNEYS April 10, 1945.  L. S. WILLIAMS  2,373,366
WEIGHING SCALE
Filed Jan. 27, 1943  2 Sheets-Sheet 2
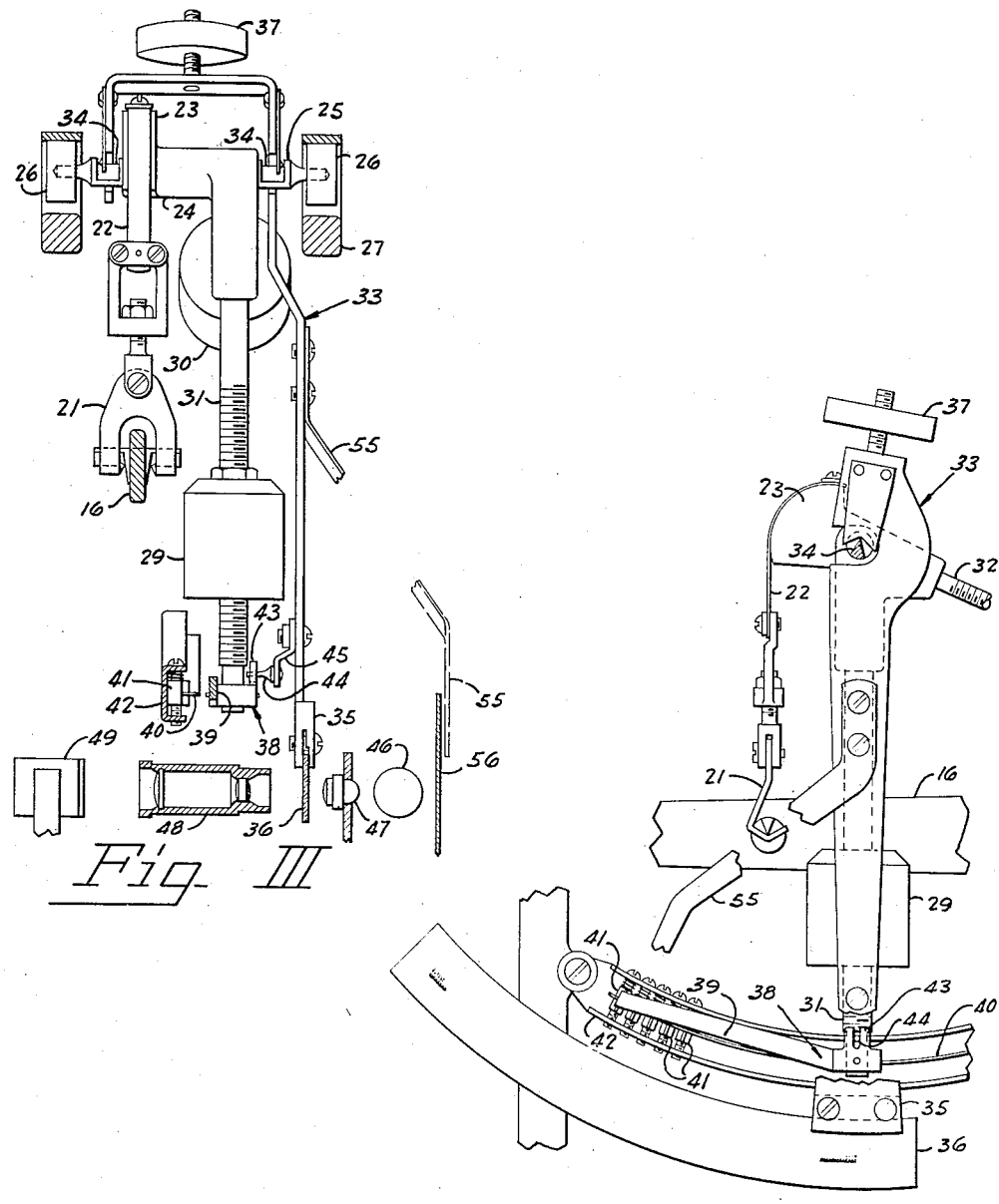
Fig. III
Fig. IV
Lawrence S. Williams
INVENTOR.
BY Marshall and Marshall
ATTORNEYS Patented Apr. 10, 1945

2,373,366

UNITED STATES PATENT OFFICE 2,373,366

WEIGHING SCALE

Lawrence S. Williams, Toledo, Ohio, assignor to Toledo Scale Company, Toledo, Ohio, a corporation of New Jersey Application January 27, 1943, Serial No. 473,691

2 Claims. (Cl. 88—24)

This application is a continuation-in-part of my co-pending application Serial No. 422,293, filed December 9, 1941, which has become U. S. Patent Number 2,321,346, dated June 8, 1943.

This application relates to indicating mechanisms for projection type measuring instruments.

In a measuring instrument in which the indication is projected in order to secure a large number of easily legible indicia, a problem inherent in the nature of the indication thus afforded is encountered. This problem results from the speed at which the indicia apparently are moved across the screen onto which they are projected. When the condition under measurement by the instrument is changing rapidly the speed of apparent movement of the indicia is so high as to render the indicia completely illegible. This problem is particularly noticeable in the use of projection weighing scales where it often is desired to "pour on." When an operator, i. e., is "pouring on," is accumulating a load on the scale, it is desirable that he be able to tell when he is approaching the desired weight without having to stop and allow the scale to come to rest so that the projected indicia are stationary and can be read.

Patent No. 2,217,244 to Williams discloses a projection scale in which the transparent indicia-bearing chart is directly mounted on the load counterbalancing pendulum and which is equipped with an auxiliary directly visible indicia-bearing chart and indicator which cooperates with the projected indication simultaneously to give visual indications corresponding to the projected indications.

It is an object of this invention to provide a projection scale in which the transparent indicia-bearing chart is not mounted on the load counterbalancing pendulum but is secured to an auxiliary member operated in accordance with the load on the scale by the load counterbalancing mechanism and which is equipped with a directly visible indication.

More specific objects and advantages are apparent from the description, in which reference is had to the accompanying drawings illustrating a preferred form of scale embodying the invention.

In the drawings:

Fig. I is a fragmentary view in elevation of a weighing scale equipped with a projection indicating device embodying the invention.

Fig. II is an enlarged fragmentary view of the projection device shown in Fig. I.

Fig. III is a further enlarged fragmentary sectional view of the load counterbalancing, chart mounting and indicating means of the device shown in Fig. II.

Fig. IV is a fragmentary view in elevation of the mechanism shown in Fig. III taken from the right side of Fig. III.

These specific drawings and the specific description that follows merely disclose and illustrate the invention and are not intended to impose limitations upon the claims.

A device embodying the invention may be employed in connection with a beam scale having a beam stand 10 and a fulcrum stand 11 on which a beam 12 is mounted. The beam 12 is equipped with poises 13 and 14 (used for "taring off") and has a nose 15 to which the device is attached. The projection device has a main lever 16 which is pivotally mounted in a stand 17 erected above a main base 18. The main lever 16 is connected to the nose 15 of the beam 12 by means of a link 19. The opposite end of the lever 16 is connected to the plunger of a motion damping dash pot 20 and by means of a stirrup 21 to the lower end of a metallic ribbon 22 which overlies the arcuate face of a sector cam 23. The cam 23 is integrally constructed with a pendulum body 24 pivotally mounted upon a shaft 25 in a pair of bearings 26. The bearings 26 are located in a bracket 27 which is mounted on the upper ends of support posts 28 secured to the main base 18. A pair of load counterbalancing pendulum weights 29 and 30 are adjustably mounted on threaded stems 31 and 32 which are studded into the body 24.

A balanced chart arm 33 which is shaped substantially like an inverted L is pivotally mounted on a pair of knife edges 34 formed on the shaft 25. The chart arm 33 has a clamping member 35 at its lower end which holds an arcuate transparent indicia-bearing chart 36. The chart arm 33 also is equipped with a weight 37 to counterbalance the mass of the indicia-bearing chart 36.

The chart arm 33 is connected to and driven by the load counterbalancing pendulum mechanism by means of a differential connection comprising a bell crank 38 which is pivotally mounted at the lower end of the pendulum stem 31. A longer arm 39 of the bell crank 38 is bifurcated and is engaged with a ribbon 40 mounted parallel to the path of movement of the pendulum stem 31 and chart arm 33. The ribbon 40 is mounted in a plurality of adjustable lugs 41 located in a frame 42. The bell crank 38 also has a short bifurcated arm 43 engaged by a pin 44 riveted to a clip 45 which is secured on the chart arm 33.

The strip 40 is selectively deformable by adjusting the positions of the lugs 41 and thus when the pendulum 31 is angularly moved in response to loads placed on the weighing scale, the long arm 39 of the bell crank 38 is swung by the deformed portions of the ribbon 40 to move the chart arm 33 differentially with respect to the pendulum. By deforming the ribbon 40 errors in the operation of the mechanism can be compensated for and the scale "sealed out" at a plurality of positions.

Sensitive and accurate indication is provided by a projected image of the indicia borne by the chart 36. Mechanism for projecting such image comprises a lamp 46, condenser lens 47, objective lenses 48, mirrors 49 (Fig. III), 50 (Fig. II) and 51 and a screen 52 which is visible through an aperture 53 in a housing 54.

The auxiliary indicating means which permits the operator of the scale to tell when he is approaching the desired weight comprises an index 55 which, in the embodiment shown, is secured to the chart arm 33 and extends into cooperating relation with a stationary indicia-bearing chart 56 in an aperture 57 in the housing 54.

The indication afforded by the projection means is highly accurate and permits the weighing scale to be employed for extremely accurate weighings of large amounts. The indication afforded by the visible index 55 and chart 56 is, of course, much less accurate and preferably is employed only for approximations of weight or indicating approach to a desired weight while the mechanism is in motion.

The embodiment of the invention that has been disclosed may be modified to meet various requirements.

Having described my invention, I claim:

1. In a weighing scale, in combination, load counterbalancing mechanism movable in response to loads being counterbalanced, a member pivotally mounted on said load counterbalancing mechanism, a cam adjacent the path of said mechanism, means on said mechanism to move said member substantially in synchronism therewith and in cooperation with said cam to produce differential motion between said mechanism and said member, a pointer and a transparent indicia bearing chart carried by said member, a fixed indicia bearing chart adjacent the path of the pointer for providing coarse indications of weight, a screen, and optical means for projecting an image of indicia of said transparent chart on said screen for providing precise indications of weight.

2. In a condition measuring instrument having condition responsive mechanism movable in response to changes in condition, in combination, dual indicating means comprising a member pivotally mounted on said mechanism, a cam adjacent the path of said mechanism, means on said mechanism for moving said member substantially in unison therewith and in cooperation with said cam for moving said member differentially with respect to said mechanism, a transparent indicia bearing chart carried by said member, a screen, optical means for projecting an enlarged image of indicia of said transparent chart to provide indications of the condition being measured, a pointer carried by said member and a fixed indicia bearing chart adjacent the path of the pointer to provide coarse indications of the condition being measured.

LAWRENCE S. WILLIAMS.